June 28, 1938.   C. H. SCOTT   2,122,385
SEDIMENTATION APPARATUS (LONG AND SHORT TORQUE ARMS)
Filed Jan. 27, 1937   4 Sheets-Sheet 1

INVENTOR
CHARLES H. SCOTT
BY
ATTORNEY.

June 28, 1938.  C. H. SCOTT  2,122,385
SEDIMENTATION APPARATUS (LONG AND SHORT TORQUE ARMS)
Filed Jan. 27, 1937  4 Sheets-Sheet 2

INVENTOR
CHARLES H. SCOTT
BY
ATTORNEY.

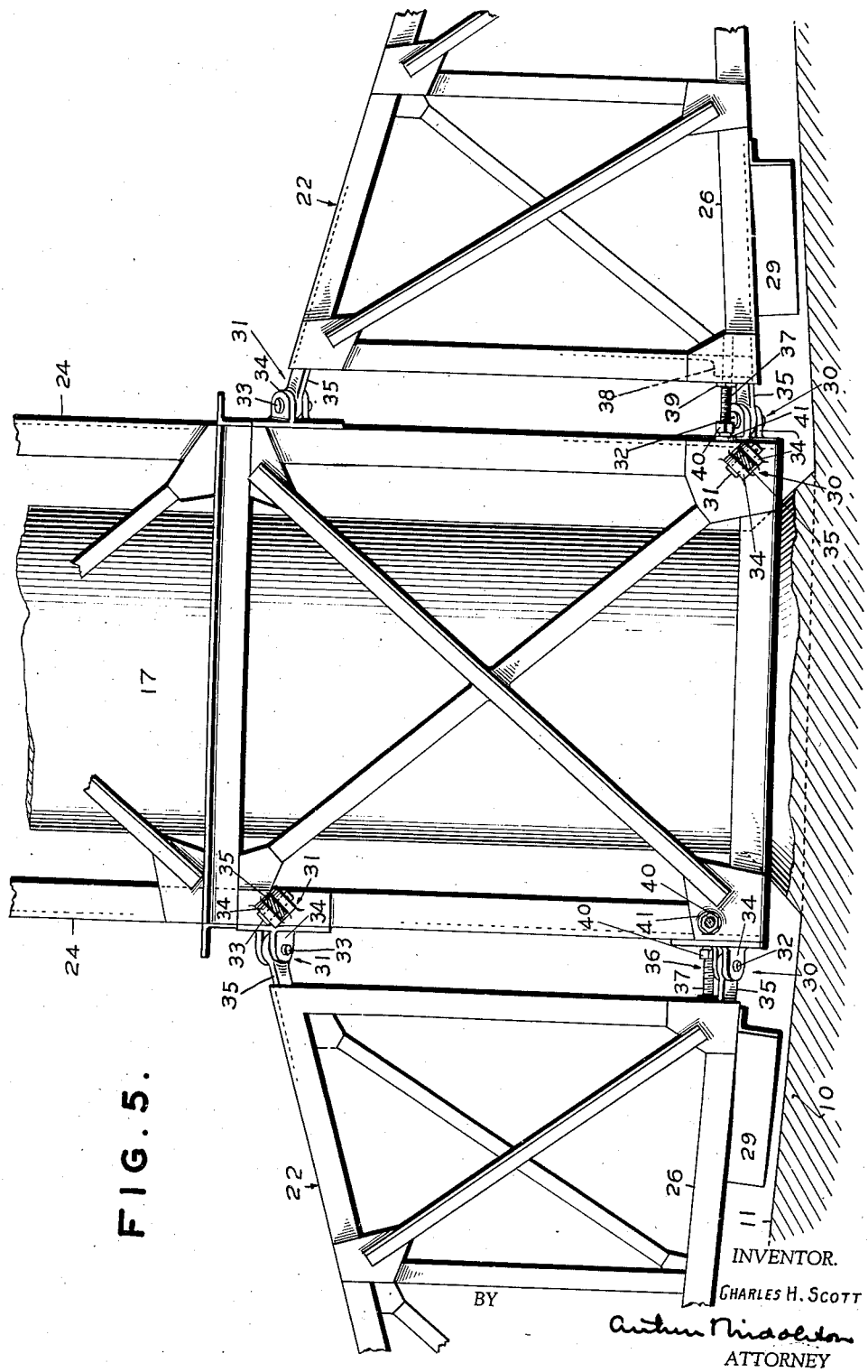

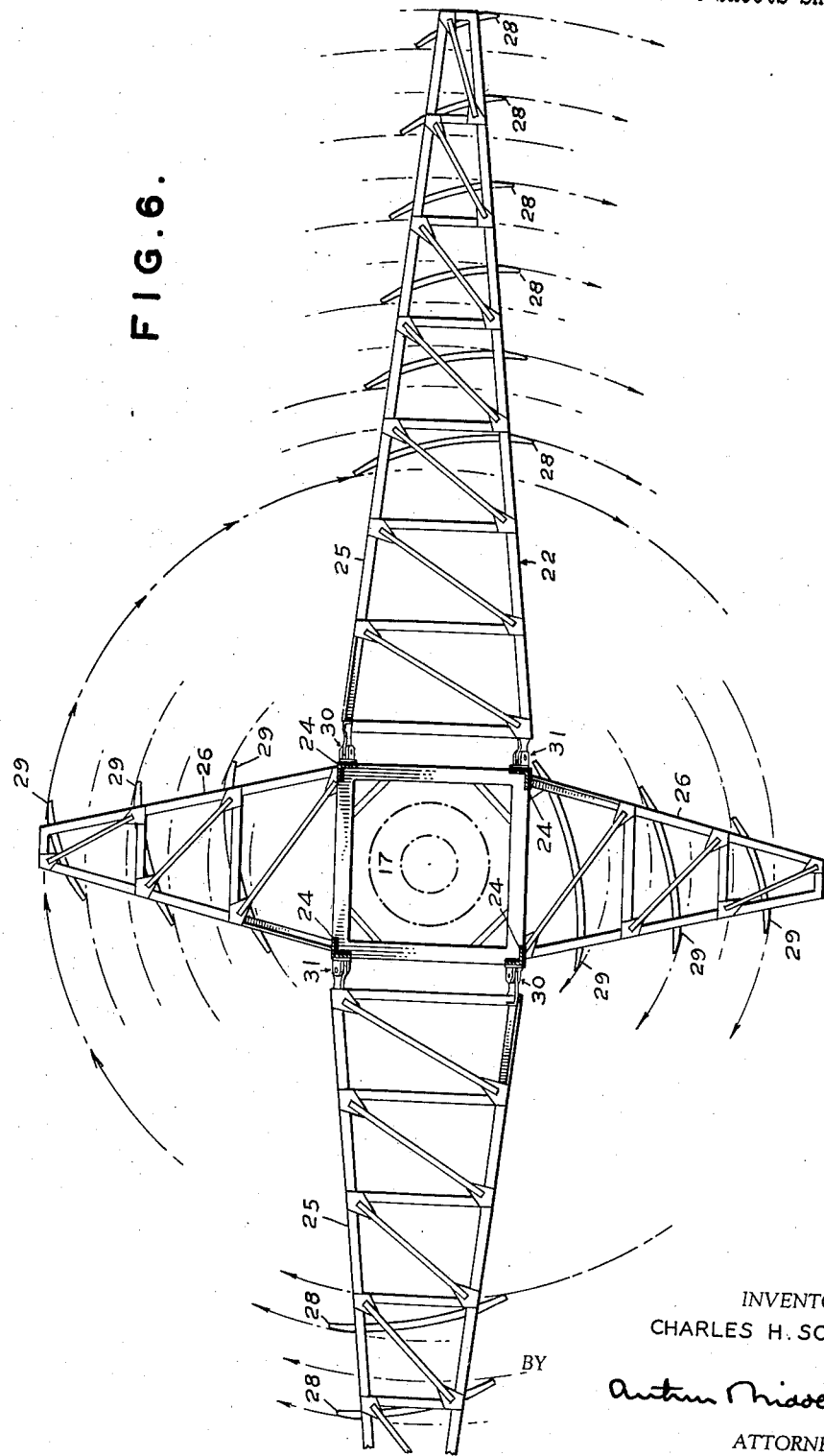

Patented June 28, 1938

2,122,385

UNITED STATES PATENT OFFICE 2,122,385

SEDIMENTATION APPARATUS (LONG AND SHORT TORQUE ARMS)

Charles H. Scott, Queens Village, N. Y., assignor to The Dorr Company, Inc., New York, N. Y., a corporation of Delaware Application January 27, 1937, Serial No. 122,511

5 Claims. (Cl. 210—55)

The present invention relates to sedimentation units having what is frequently referred to as clarifying settling or thickening tanks in which a sediment raking mechanism disposed over the tank bottom functions incident to a turning thereof to effect a raking and transfer of sedimented or settled solids to a discharge section of the tank. The invention according to one aspect thereof relates to a unit in which the sediment raking mechanism comprises rake arms that are pivotally mounted on and in respect to a horizontally turnable cage or arm-carrying structure so that upon raking elements of a pivotally supported arm encountering an obstruction there is permitted an automatic upward and in effect a lagging or rearward swinging movement of the outer end of the particular arm relative to the supporting carrier therefor as the latter moves forwardly.

The present invention revolves about a sediment raking mechanism in which there are employed rake arm constructions or rake arms of different lengths some of which may be referred to as long arms while others thereof may be referred to as short arms. These arms are preferably symmetrically arranged and disposed in respect to the carrying structure therefor and at least the long arms are pivotally mounted so as to permit a swinging movement as above described in respect to the carrying structure. The short arms may be but are not necessarily pivotally mounted as this feature is to be determined according to the desires of a designer or operator of a particular installation. The long arm is preferably provided with raking elements disposed along only the outer end section thereof, or, as might be described along the major portion thereof particularly along the outer end section thereof. The short arms are provided for raking the section of the tank bottom which is not raked by the long arms due to the omission of effectual raking elements along the inner end section of the long arms.

An important and underlying feature of the present invention resides in the fact that the short arm is provided with raking elements or means, to wit, a series of raking blades for essentially functioning over what may be viewed as an annular inlying section of a settling tank bottom while the pivotally-mounted long arm is provided with raking elements or means, to wit, a series of raking blades for essentially functioning over only what may be viewed as an annular outlying section of the tank bottom. The inner and outer diameters of the annular outlying section are, of course, respectively larger than the corresponding diameters of the annular inlying section. The cooperating or combined raking of the two arms is toward a centrally or inwardly disposed sediment discharge.

The sedimentation units to which the present invention is directed are for use in many fields of industry such as in metallurgical fields for the recovery of metallurgical pulp from liquid mixtures containing same or for the elimination of settled solids such as silt from waters containing the same and in many other fields which might be mentioned.

Each pivotally mounted arm is supported from its carrying structure through the medium of hinges which are vertically and horizontally spaced and arranged with the pintle axes in alignment along a line having a downward or rearward slope or inclination with respect to the forward horizontal raking movement of the arm-carrying structure whereby upon an obstruction being encountered there is permitted a lifting movement of the free or swinging end of the pivoted arm and a lagging or relative rearward movement of the free end of the arm with respect to the carrier which continues its forward movement. In the arrangement just described the raking blades on the arms have rearward and inward inclination with respect to their forward paths of movement.

According to an underlying feature of the present invention the raking elements on each pivotally-mounted long rake arm are disposed for essentially raking only an outlying section or, as otherwise expressed, the raking elements on each pivotally-mounted long arm are disposed so as to avoid raking a substantial portion of the inlying tank bottom section.

One main feature of the invention revolves about a sediment raking mechanism as an article of manufacture particularly suitable for use in a sedimentation or thickening tank and which raking mechanism includes in associated relationship pivotally mounted long rake arms essentially effective for accomplishing a raking operation only along the outer section of a tank bottom thereof and stub or short arms disposed for completing the work by performing a raking operation over the inner section of the tank bottom.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:—

Figure 1:
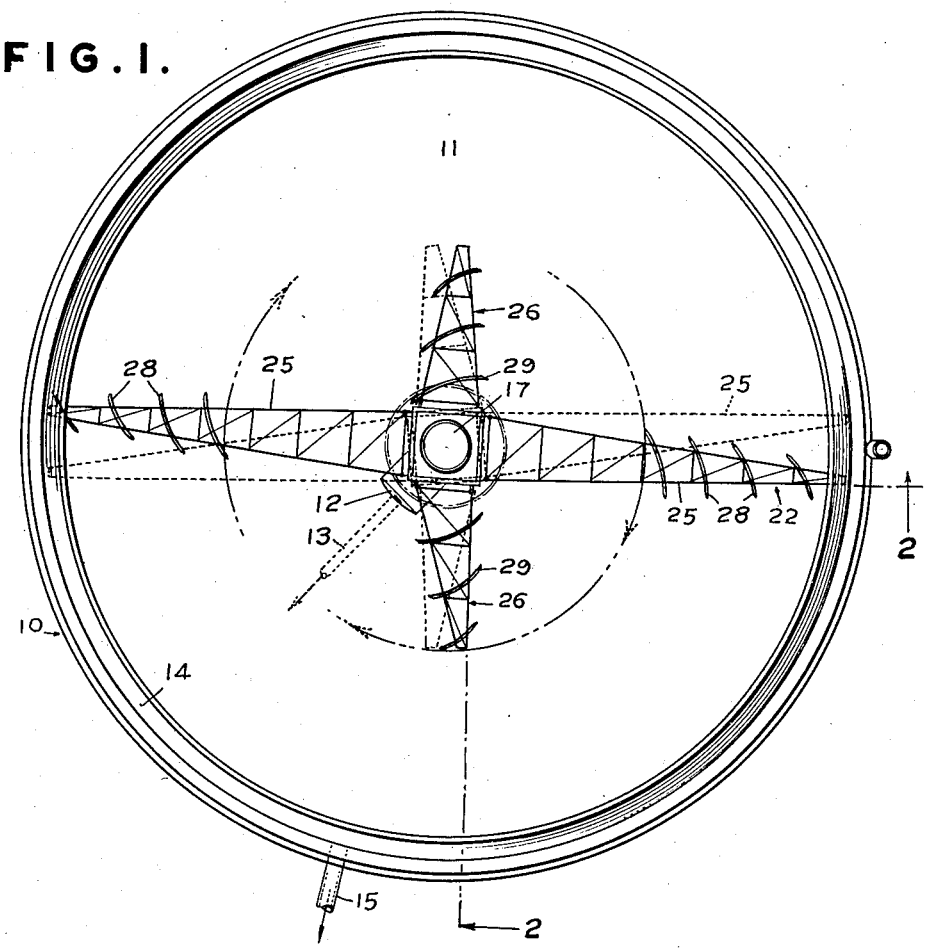
Fig. 1 is a plan view of a sedimentation or thickening tank showing therein a sediment raking mechanism by which the present invention is realized.

Fig. 5 is an elevation considerably enlarged as compared with Fig. 1 and shows a portion of the centrally arranged pier about which the arm-carrying structure turns and in this figure there is clearly illustrated the pivotal or hinge mounting for the inner ends of the long and short arms and also an adjustable stop means which is relied upon for determining the lowermost operative position of the arms relative to the arm-carrying structure; and Fig. 6 is a plan view enlarged as compared with Fig. 1 showing the relation of the raking blades of the long and short arms. In this figure the short arms are shown as fixedly secured to the carrying structure therefor; otherwise the arrangement and details of the parts thereof are the same as in a construction in which the short arms are pivotally mounted.

Reference will now be made to the drawings in detail.

In the drawings 10 designates a settling tank suitable for use in a sedimentation unit of general application. Such tank is preferably cylindrical, or at least of a form devoid of sharp vertical corners and of a horizontal internal cross section between that of a square as one limiting form and that of a circle as the other limiting form. The tank has a bottom 11 sloping downwardly at any desired angle to a central well or sump 12 for receiving sedimented solids passed thereto by the settled solids raking mechanism which functions within the tank. Connected to the section providing the central well or sump and leading from the bottom thereof is a settled solids withdrawal pipe 13 providing a sediment discharge for the tank. Adjacent the top or upper portion of the tank 10 and extending along the periphery thereof there is provided a trough 14 constituting an effluent launder which with a discharge pipe 15 leading therefrom constitutes a supernatant liquid withdrawal means. An upper edge portion of the trough or launder 14 provides a weir over which the supernatant liquid flows into the trough and this weir determines the normal operative level of the body of liquid undergoing sedimentation within the tank. Any suitable influent pipe or conduit constituting a tank feeding means can be employed and such conduit is designated by 16. In the construction shown this influent pipe is provided by a stationary pier 17 which is made hollow whereby the liquid solids mixture which is fed upwardly through the pier is delivered into the central section of the sedimentation tank and from which the liquid passes at a gradual and progressively decreasing flow rate to the marginal launder. This arrangement permits an early settling of readily settleable solids in the central regions of the tank and allows for a progressive settling of the less readily settleable solids as the liquid passes toward the marginal walls of the tank. It will be noted that in accordance with the quantity of liquid solids mixture fed into the tank through the feed pipe or conduit 16 there is a consequent and corresponding quantity of discharge of supernatant liquid into the trough and thence from the sedimentation unit. The pier 17 extends upwardly from the bottom of the tank and is preferably centrally disposed with respect to the marginal wall of the tank and the well or sump 12 is disposed adjacent to the base of this pier. The pier may be viewed as a stationary upstanding pedestal and it carries at the top thereof a stationary bearing member 18 and an upward extension constituting a stationary platform 19. On the platform 19 there is mounted a motivating means provided as by an electric motor or other prime mover 20 and suitable speed reducing and power transmission mechanism collectively designated as 21 that is relied upon for imparting horizontal turning movement to the sediment raking mechanism hereinafter immediately referred to and described in detail.

The sediment raking mechanism which is sometimes referred to as the settled solids raking assemblage is collectively designated as 22 and comprises a turnable bearing member 23 mounted on the stationary bearing member 18 so as to rotate about a vertically extending axis concentric with the pier when driven by the motivating means 20. The turnable bearing member supports a depending arm-carrying structure 24 from the lower portion of which there are carried long rake arm constructions 25 and short rake arm constructions 26. The depending arm-carrying structure is preferably provided by a framework or cage and surrounds the pier 17. The rake arm constructions, particularly the long rake arm constructions, are pivotally supported through the medium of hinges arranged, as will be presently described in detail, so as to permit upward and rearward swinging movements of the free or outer ends of the arm constructions. The pivoted arm constructions when in their lowermost positions derive support not only through the medium of the hinges, but also through the adjustable stop means interposed between each arm construction and the arm-carrying structure as will presently appear.

The arm-carrying structure 24 is provided by the framework or cage that is made up of wrought metal in the form of rolled structural shapes such as vertically extending angle irons tied together and connected by horizontal members and diagonal braces whereby a relatively rigid skeleton type of structure results. This framework or cage is preferably non-cylindrical and in fact is preferably square in horizontal cross section but not necessarily so as it may be horizontal in cross section. On two of the opposite faces of the square framework or cage 24 there are pivotally mounted the long rake arm constructions 25 which are sometimes referred to as the long rake arms and on the other two and opposite faces there are mounted, preferably but not necessarily pivotally mounted, the short rake arms. The long and short arms 25 and 26 are made so as to comprise in assembled relationship relatively long structural shapes such as rolled angles or tees constituting members which are sometimes referred to as longitudinals and which are tied together by gusset plates and transverse braces. The arm constructions are preferably triangular in vertical cross section. The long arms 25 are of a length to have the outer ends terminate adjacent to or in the immediate vicinity of the inner face of the upstanding marginal wall 27 of the tank 10.

To the under surface or at the lower section of the long arms 25 are attached or embodied raking blades 28. The blades 28 are so arranged as to rake or move the sediment or sludge on the bottom of the tank toward the central portion of the tank bottom. The raking blades 28 of the long arms 25 are arranged in effect parallel to each other and are disposed so as to occupy approximately two-thirds of the length of the arms measured inwardly from the outer ends thereof. The short arms 26 are approximately one-third the length of the long arms 25 and are provided with or embody raking blades 29. The raking blades 29 are disposed at and throughout the entire length of the lower portion of the short arms. Normally the raking blades 28 and 29 are disposed above but proximate the bottom 11 of the tank. The raking blades may be viewed as raking elements provided by and as constituting a part of the raking arm constructions to which they correspond.

As to the pivotal or hinge mounting for the long and short arms this is clearly indicated and shown in and by the several figures thereof but particularly in and by Fig. 5.

In the form as illustrated by Figs. 1, 2, 3 and 5 each of the arms is provided with horizontally and vertically spaced hinges 30 and 31, the hinge member 30 being a lower hinge member which is sometimes referred to as a rear bottom hinge and the hinge 31 being an upper hinge member which is sometimes referred to as a front upper hinge. The pintle axes 32 and 33 of the hinges 30 and 31 are in alignment, to wit, along a downwardly and rearwardly inclined line as shown in Fig. 5. Each of the hinges comprises a fixed leaf 34 which is secured to a face of the square framework or cage constituting the arm-carrying structure, and a swingable leaf 35 to which the inner end of the rake arm construction is connected, to wit, in the immediate region or vicinity of a main longitudinal of the arm construction. The fixed leaf of each hinge is preferably but not necessarily connected to the framework in the immediate vicinity where the vertical structural members or vertical corner members have connections with horizontal tie members and braces. The hinges 30 and 31 provide the pivotal support for the swinging arm constructions and because of the inclination of the pivotal axes of the hinges as a set there is permitted the upward and rearward movement of the free end of the rake arm constructions thus carried by the particular set.

Each of the pivotal arm constructions, to wit, long arms 25 or the short arms 26 as the case may be is provided with a suitable low limit stop construction 36. This stop construction is functionally disposed between the arm-carrying structure or cage 24 on the one hand and the swinging rake arm constructions 25 or 26 as the case may be on the other hand. In the arrangement shown the low limit stop is provided by a threaded bolt 37 that is carried in a corresponding threaded section or nut 38 which in effect serves as a bolt carrying member located in the immediate vicinity or region of the inner end of a lower forward longitudinal of the rake arm constructions. The bolt is locked in place in respect to the carrying nut 38 by a lock nut 39. The head 40 of the bolt has abutting engagement with a buffer or striker plate 41 that is on the arm-carrying structure or cage 24 preferably in the vicinity where a corner vertical has horizontal tie members and brace members connected thereto. The bolt 37 and the striker plate 41 collectively provide the adjustable stop means which defines the lowermost limits for the arm carrying constructions corresponding thereto. The low limit stop construction in connection with the hinges corresponding thereto provide what may be viewed as an intermediate means or mechanism by which each pivotal arm construction derives its support from the arm-carrying structure. It will also be manifest that the bolt 37 can be relied upon to adjust the position of the rake arm constructions and consequently the raking blades 28 or 29 as the case may be in relation to the bottom 11 of the tank.

Figure 4:
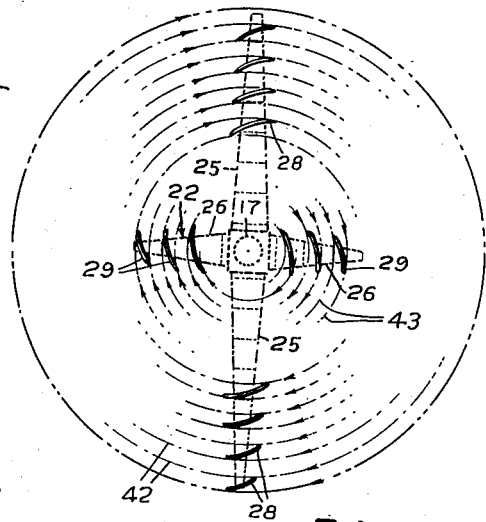
Fig. 4 is a schematic view graphically illustrating the areas respectively swept by the raking blades of the long and short arms.

The hinge constructions above described will permit the arms 25 and 26 to tilt on or about the pintle axis which lies at an angle to the axis of rotation of the square framework or cage 24. As the raking blades 28 and 29 on the arms 25 and 26 respectively encounter an obstruction such arms will rotate or tilt on their axes relative to the raking support therefor and the outer ends will lift and consequently assume upward and rearward positions relative to the framework or cage 24 which of necessity during the normal operation thereof will continue its forward rotation movement. As above stated the forces which produce the lifting of the outer end of a particular arm has both radial and tangential components and because of the length of the long arm a tangential component produces a greater lifting influence on a long arm than it does on a short arm. Figure 4 illustrates graphically the area of the bottom 11 of the tank which is swept over by the blades 28 and 29. The outer groups of circles 42 of said figure mark the area swept over by the blades 28 of the long arms 25 while the inner group of circles 43 mark the area swept by the blades 29 of the short arms 26.

The hinges of the short arms are shown at the same heights on the framework or cage 24 as the hinges of the long arms 25. This is primarily for convenience. It is possible to have the upper hinges for the short arms higher than is practical or necessary for the long arms, this in order that advantage of a longer vertical arm may be desired for use in conjunction with the radial component required for lifting the arms. This same effect may be accomplished by positioning the upper rear hinge somewhat forwardly thereby increasing the angle of the pintle axes in respect to the horizontal. By having the hinges of the short arms relatively high advantage may be taken of the radial forces of heavy center loads to impart a large part of the lifting forces to the short arms. The position of these hinges, however, is largely a question of design in so far as the requirements of a particular hinge arrangement or installation is involved. In general in respect to the hinges of the several sets, the upper hinges should have the same elevation, the lower hinges should have the same elevation, and there should be the same horizontal spacing as between the front and rear hinges of each of the several sets whereby the arms may be made interchangeable.

Figure 2:
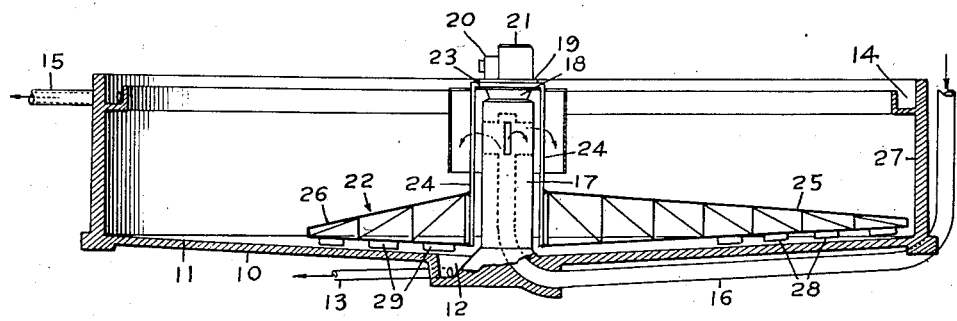
Fig. 2 is a sectional elevation of the tank shown in Fig. 1 and is a view taken as on the broken line 2—2 looking in the direction of the arrows and with one each of the long and short rake arms in elevation.
Figure 3:
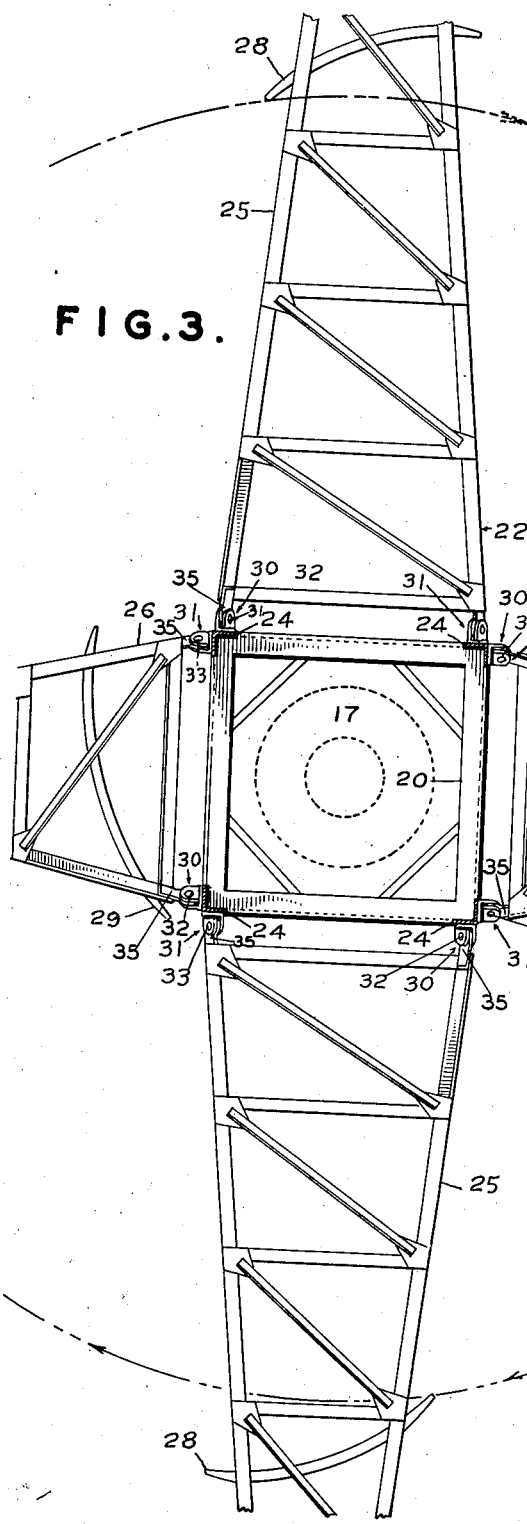
Fig. 3 is a plan view enlarged as compared with Fig. 1 and shows a portion of the central part of Fig. 1 and illustrates the pivotal mounting of the long and short rake arms.

The construction shown in Fig. 6 is substantially the same as that of Figs. 1, 2 and 3 with the exception that according to the arrangement of Fig. 6 the short arms are fixedly secured to the carrying structure therefor, to wit, to the cage 24. This Fig. 6 clearly shows in plan the relationship of the raking blades as employed on the long arms and as employed on the short arms, and also the position of the blades of the long arms as compared with the raking blades of the short arms.

The horizontally-movable arm-carrying structure 24 of the settled solids raking assemblage may be viewed as a unidirectional horizontally-turnable rake-arm construction that continuously moves forwardly within or along a closed path whereby due to said movement the pivotally mounted long arms rake an outer annular or closed portion of the bottom or floor section of the tank and whereby short or stub arms rake an inner annular or closed portion of the bottom or floor portion of the tank. The raking means or blades on the long arm are disposed so that they leave essentially unraked thereby substantial portions of the inner annular floor section with the result that each of the rake arms perform a part of the work of raking the floor bottom and with the result that both the long and short rake arms are essential to the raking and transferring of sedimented solids to the inwardly or centrally disposed sediment discharge. The sediment discharge sump 12 herein described is located immediately below or in the immediate vicinity of the lower end of this arm-carrying structure 24. The inner annular floor section mentioned is located next to and merges into the sediment discharge sump and it may be properly described as located proximate the region in which the arm-carrying structure moves.

I claim:

1. A sedimentation unit comprising a tank having a bottom with marginal wall, means for supplying a liquid-solids mixture to the tank, supernatant liquid withdrawal means leading from the upper portion of the tank and a sediment discharge leading from the central lower portion of the tank; and in association with the foregoing a sediment raking mechanism having a unidirectional horizontally-turnable arm-carrying structure and outwardly extending rake arms supported thereby and provided for cooperatively collecting and transferring sedimented material from diverse sections of the tank bottom to said sediment discharge; which said rake arms comprise short rake arms provided with blades for raking only an inlying annular section of the tank bottom and also long pivotally-mounted rake arms extending outwardly into a region beyond that traversed by the raking blades of the short rake arms and provided with blades disposed for raking only an annular floor section of the tank bottom of which the inner and outer diameters are relatively large as compared with the corresponding diameters of the aforementioned inlying annular floor section and particularly disposed so as to essentially leave unraked thereby a substantial portion of the inlying annular floor section, each pivotally-mounted rake arm being supported from the arm-carrying structure through the medium of vertically and horizontally spaced hinges arranged with the pintle axes in alignment along a line having a downward and rearward slope.

2. A sedimentation unit comprising a tank having a bottom with marginal wall, means for supplying a liquid-solids mixture to the tank, a supernatant liquid withdrawal means leading from the upper portion of the tank, and a sediment discharge leading from the central lower portion of the tank; and in association therewith a sediment raking mechanism having an arm-carrying structure horizontally-movable along a closed path and a set of outwardly extending rake arms supported thereby and provided for collecting and transferring sedimented material from diverse sections of the tank bottom to said sediment discharge; which said rake arms comprise a stub arm having raking means disposed for functioning only over an inlying floor section of the tank that is proximate the path along which the arm-carrying structure moves, and a pivotally-mounted arm extending into a region outwardly beyond that traversed by the stub arm and having raking means disposed for functioning over a floor section of the tank of which the inner and outer diameters are relatively large as compared with the corresponding diameters of the aforementioned inlying floor section and furthermore particularly disposed so as to leave essentially unraked thereby a substantial portion of the inlying floor section; said pivotally-mounted arm being supported from the arm-carrying structure through the medium of vertically and horizontally spaced hinges arranged with the pintle axes in alignment along a line having downward and rearward slope.

3. A sedimentation unit as defined in and by claim 2 wherein the stub arm is short with raking means disposed substantially along the entire length thereof and has rigid connection with the arm-carrying structure and wherein the pivoted arm is long with raking means disposed along only the outer end section thereof.

4. A structure as defined in and by claim 2 as a main claim wherein the raking means are provided by sets of raking blades arranged along the arms to which they correspond and in spaced relationship with respect to each other and have rearward and inward inclinations for effecting step by step inward raking movements; and according to which each rake arm is pivotally-mounted and is supported from the arm-carrying structure through the medium of hinges as defined in and by the main claim.

5. A sediment raking assemblage for employment in a settling tank having a stationary supporting means; which raking assemblage comprises in combination an arm-raking structure adapted for unidirectional horizontal turning movement when mounted upon the stationary supporting means and rake arms extending outwardly from said arm-carrying structure for cooperatively raking and transferring sedimented material from diverse sections of the bottom of the tank to a sediment discharge section disposed in a region proximate that in which the arm-carrying structure moves; of which rake arms some are short and have raking elements essentially disposed for raking an inlying section of the tank bottom and of which others are long and pivotally-mounted with the swinging ends thereof extending into a region outwardly beyond that traversed by the short arm and have raking elements essentially disposed relative to the raking elements of the short arms for raking an outlying section of the tank bottom and for transferring settled material to and under operative influence of the raking elements of the short arms; the raking elements of the long arm also being essentially disposed so as to leave unraked thereby a substantial portion of the aforementioned inlying section of the tank bottom; the means by which the long arm is pivotally-supported from the arm-carrying structure being provided by vertically and horizontally spaced hinges arranged so that the pintle axes are in alignment along a rearwardly and downwardly sloping line.

CHARLES H. SCOTT.